United States Patent
Kamekura et al.

[11] 3,896,000
[45] July 22, 1975

[54] HALOPHILIC NUCLEASE AND A PROCESS FOR PRODUCING THE SAME

[75] Inventors: Masahiro Kamekura, Urawa; Hiroshi Onishi, Noda, both of Japan

[73] Assignee: Noda Institute for Scientific Research, Noda, Japan

[22] Filed: Oct. 16, 1973

[21] Appl. No.: 406,798

[30] Foreign Application Priority Data
Oct. 18, 1972 Japan.............................. 47-103600
Aug. 20, 1973 Japan.............................. 48-92390

[52] U.S. Cl................. 195/62; 195/66 R; 195/28 N
[51] Int. Cl.²........................................ C12D 13/10
[58] Field of Search............. 195/65, 66 R, 28 N, 62

[56] References Cited
UNITED STATES PATENTS
3,424,654  1/1969  Hansen ................................. 195/66
3,719,562  3/1973  Rothrock et al. ................. 195/66 R
3,767,530  10/1973  Onishi................................... 195/62

*Primary Examiner*—Lionel M. Shapiro
*Attorney, Agent, or Firm*—Schuyler, Birch, Swindler, McKie & Beckett

[57] ABSTRACT

A halophilic nuclease can be obtained by culturing a microorganism belonging to the genus Micrococcus and capable of producing a halophilic nuclease in the presence of sodium chloride and/or potassium chloride such as, for example, Micrococcus varians var. halophilus var. nov. (ATCC No. 21971, FERM-P No. 1648) in a medium containing sodium chloride and/or potassium chloride to accumulate the nuclease therein and collecting it. The thus obtained halophilic nuclease releases alcohol-soluble nucleotides by hydrolyzing deoxyribonucleic acid (DNA) or ribonucleic acid (RNA).

11 Claims, 4 Drawing Figures

HALOPHILIC NUCLEASE AND A PROCESS FOR PRODUCING THE SAME

This invention relates to a process for producing a halophilic nuclease and in particular to a process for producing an enzyme having a capability of producing alcohol-soluble nucleoides by hydrolyzing deoxyribonucleic acid (DNA) or ribonucleic acid (RNA).

Figure 1:
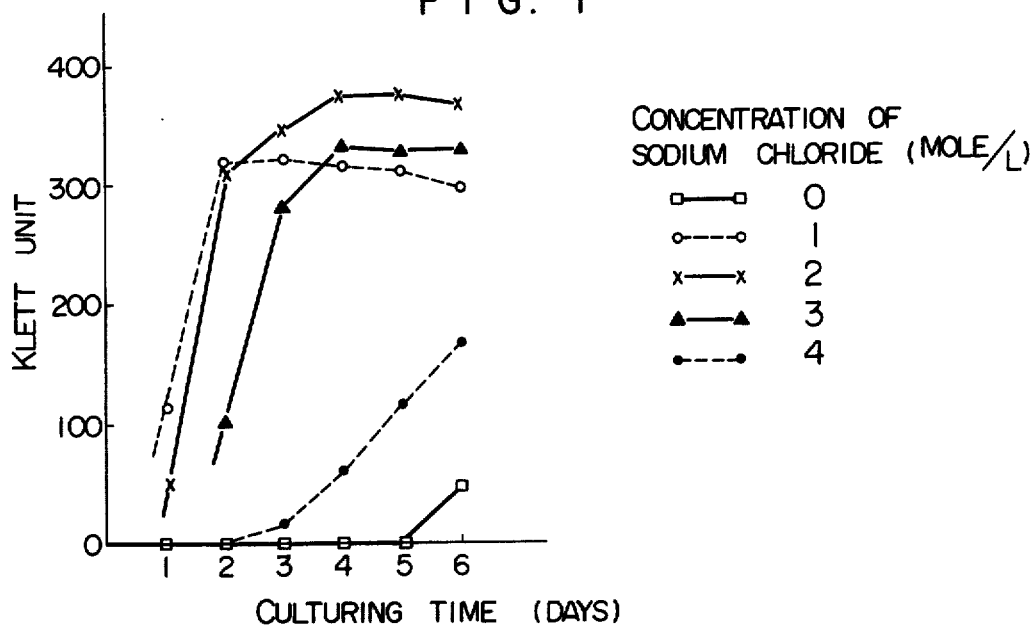
Figure 2:
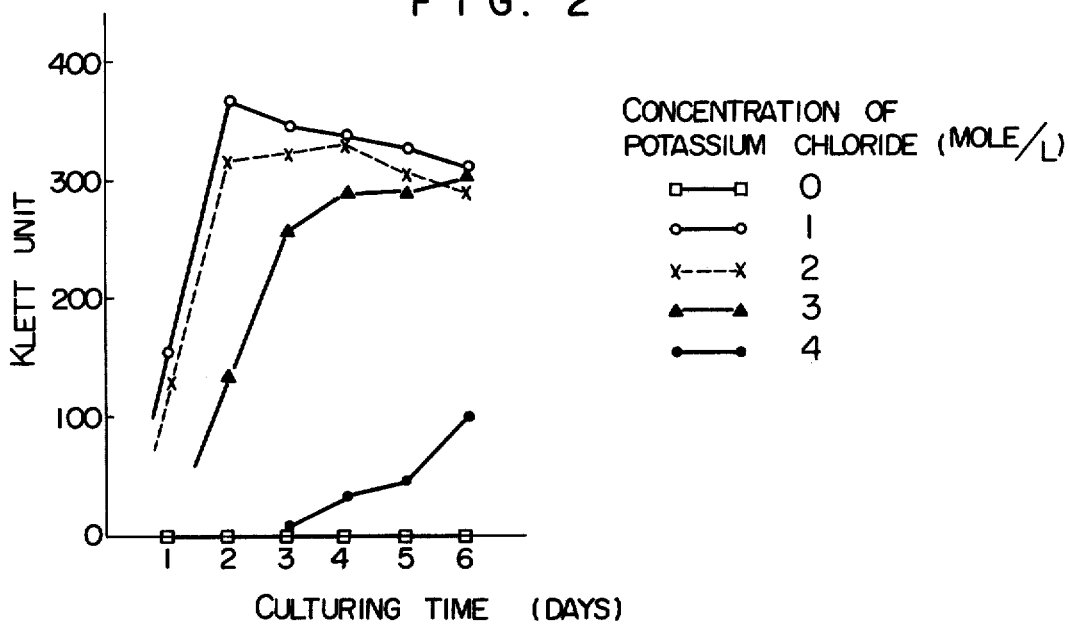
Figure 3:
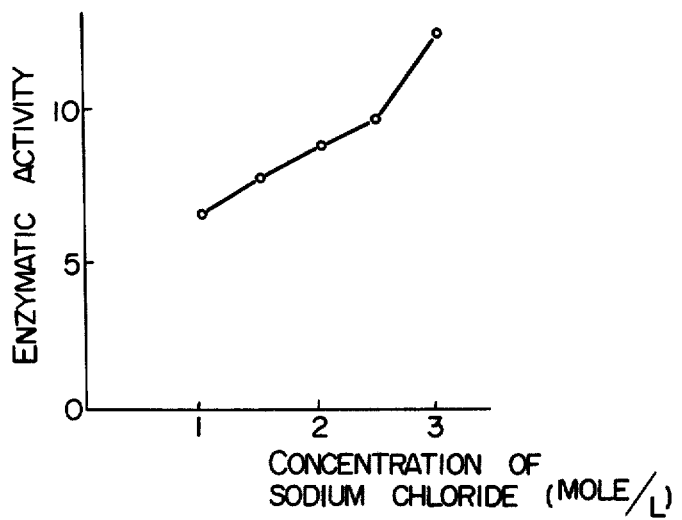
Figure 4:
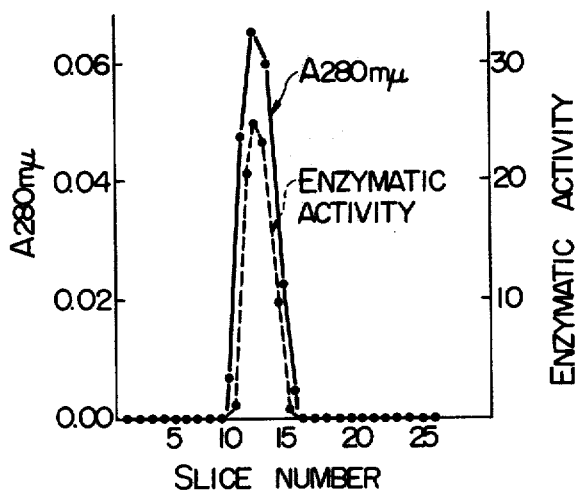

FIG. 1 shows the relationship between the days of culturing in various concentrations of sodium chloride and the absorbance measured by Klett-Summerson photoelectric colorimeter, FIG. 2 shows the relationship between the days of culturing in various concentrations of potassium chloride and the absorbance measured by Klett-Summerson photoelectric colorimeter and FIG. 3 shows the relationships between the enzymatic activity when used DNA as a substrate and the concentration of sodium chloride in reaction solutions. Furthermore, FIG. 4 shows the relationship between the absorbance of protein obtained by subjecting the present purified enzyme to electrophoresis at 280 μ and the enzymatic activity thereof.

It is well known that the nucleases are the enzymes capable of hydrolyzing the phosphodiester bond and produced by microorganisms belonging to the genus Azotobacter, Bacillus, Neurospora, Staphylococus and the like [see, for example, J. Biol. Chem. 235, 3016 (1960), J. Bact. 91, 1004 (1966), J. Biol. Chem. 240, 1287 (1965), J. Am. Chem. Soc. 80, 2546 (1968)], however, the enzymatic activities of those nucleases are inhibited to a great extent in the presence of sodium chloride and they hardly show their activities in the presence of 1 mole of sodium chloride in 1 litre of reaction solutions.

It has been recently noted to apply nucleases to food industries fields and it is strongly desired to develop nucleases which are stable and active in the presence of sodium chloride in the application thereof.

Therefore, the present inventors searched for microorganisms capable of growing in a medium containing a high concentration of sodium chloride in various ways in order to find out a nuclease showing a strong activity in the presence of sodium chloride and have found that a bacterium belonging to Micrococcus, which was isolated from unmatured soy source mash, can produce a halophilic nuclease showing a quite strong enzymatic activity even in the presence of a high concentration of sodium chloride.

The morphological characteristics of the present microorganism capable of producing the halophilic nuclease are given as follows:

1. Shape
   1. Shape and size of cells: Cocci, 0.5 – 1.0μ in diameter, cells occur in irregular masses, sometimes occur singly or produce pairs or tetrads.
   2. Existence of pleomorphism: none
   3. Motility : motile
   4. Formation of spores : none
   5. Gram stain : positive II. Growth states in various nutrient media:
   1. Bouillon agar plate culture:
   The diameter of the colonies is 0.5 – 1.0 mm. The shape thereof is dot-like and the edge of the colonies is entire. The surface thereof is smooth, the elevation of growth is convex and the optical characters are opaque but glossy.
   2. Bouillon agar slant culture:
   The growth is moderate, the shape is filiform and raises slightly. The surface is smooth, the color thereof is yellow and glossy.
   3. Bouillon liquid culture:
   The surface growth is membranous and the clouding is slight. As the growth progresses, it forms viscous sediment.
   4. Bouillon gelatin stab culture:
   It can grow until a depth of 1 cm from the surface but cannot liquify gelatin.
   5. Litmus milk:
   The medium becomes alkaline slightly, but the litmus milk does not coagulate.

III. Various physiological properties:

| | |
|---|---|
| 1. Reduction of nitrate: | – |
| 2. MR Test: | – |
| 3. VP Test: | + |
| 4. Formation of indole: | – |
| 5. Hydrolysis of starch: | + |
| 6. Inorganic nitrogen source (NH$_4$H$_2$PO$_4$): | + |
| 7. Chromogenesis: | +(forms yellow pigment, and it is not water-soluble.) |
| 8. Urease: | – |
| 9. Catalase: | + |
| 10. Relation to free oxygen: | strick aerobe |
| 11. O - F Test: | oxidative (substrate: glucose) |
| 12. Denitrification: | – |
| 13. Production of hydrogen sulfide: | – |
| 14. Assimilability of citric acid: | – |
| 15. Oxidase: | + |
| 16. Range for growth pH: | 5.5 – 10.0 |
| Temperature: | 15 – 40°C |

IV. Assimilability of carbon source (observation at 30°C for 14 days)

| | Formation of acid | Formation of gas |
|---|---|---|
| 1. L-Arabinose | – | – |
| 2. D-xylose | + | – |
| 3. D-Glucose | + | – |
| 4. D-Mannose | – | – |
| 5. D-Fructose | + | – |
| 6. D-Galactose | – | – |
| 7. Maltose | + | – |
| 8. Sucrose | – | – |
| 9. Lactose | – | – |
| 10. Trehalose | + | – |
| 11. D-Sorbit | + | – |
| 12. D-Mannit | + | – |
| 13. Inositol | + | – |
| 14. Glycerine | + | – |
| 15. Starch | – | – |

V. Other findings:
   1. Resistance against potassium chloride:
   Can grow in a medium for bacteria containing 4.0 moles of potassium chloride in 1 l of the medium.
   2. Resistance against sodium chloride:
   Can grow in a medium for bacteria containing 4.5 moles of sodium chloride in 1 l of the medium.

When the position of the present microorganism in the classification was studied with referring to 7th edition of Bergeys Manual of Determinative Bacteriology, the present microorganism was judged as the one belonging to the genus Micrococcus since it is an aerobic coccus occuring in irregular masses and the effect thereof on glucose is oxidative and the like.

Additionally, judging from the fact that the present microorganism does not form nitrites from nitrates, that the pigment is yellow and that it utilizes ammonium dihydrogen phosphate as a sole nitrogen source and the like, it was considered a microorganism which is closely related to the species *Micrococcus luteus*. However, from the description of International Journal of Systematic Bacteriology, Volume 22, 228, 1972, the present microorganism seemed more closely related to *Micrococcus varians* than to *Micrococcus luteus*, especially since it produced acid from glucose. Thus, the present microorganism is judged as that belonging to the species *Micrococcus varians*.

Furthermore, the present strain is judged as a variety of *Micrococcus various* in view of its capability of forming acids from saccharides, of hydrolyzing starch and its high halotolerance, and named as *Micrococcus varians var. halophilus var. nov*. The present microorganism has been deposited on American Type Culture Collection as ATCC No. 21971 and also deposited on Fermentation Research Institute, Agency of Industrial Science and Technology in Japan as FERM-P No. 1648.

The present invention has been completed based on these findings.

An object of the present invention is to provide a process for producing a halophilic nuclease characterized by culturing a microorganism capable of producing the halophilic nuclease in the presence of sodium chloride and/or potassium chloride and belonging to the genus Micrococcus in a medium containing sodium chloride and/or potassium chloride to accumulate the enzyme therein and collecting the one from the cultured broth.

Another object of the present invention is to provide a novel halophilic nuclease.

The present invention will become apparent in the following description.

Typical of the microorganism employable in the present process is the foregoing *Micrococcus varians var. halophilus var. nov*. but not restricted thereto. That is, without restricting to the natural strains, any microorganism belonging to the genus Microccus and having a capability of producing the halophilic nuclease can be also used.

The culturing of these strains in the present process is conducted aerobically in the presence of sodium chloride and/or potassium chloride.

Every medium for bacteria can be used as a medium for culturing, but it is essential to add sodium chloride and/or potassium chloride thereto. To 1 $l$ of the medium are added 1 – 4 moles, preferably 2 – 3 moles of sodium chloride or potassium chloride. In the case that sodium chloride and potassium chloride are added to the medium, an appropriate amount of sodium chloride is added to potassium chloride so as to make the sum of the two chlorides 1 – 4 moles/$l$, preferably, 2 – 3 moles/$l$.

It is necessary that the culturing of the present microorganism is conducted under aerobic conditions with forced aeration or shaking.

As one example of experiments, the present microorganism was inoculated to the media containing 0 – 4 moles/$l$ of sodium chloride in test tubes, respectively, and cultured under aerobic conditions for 6 days at 30°C at the initial pH 7.0 with shaking. As is shown in FIG. 1, there was observed slight growth after lag phase lasting for 5 days in the case that no sodium chloride was added to the medium but there was observed excellent growth in media containing 1 – 3 moles/$l$ of sodium chloride and sufficient growth in the medium containing 4 moles of sodium chloride. Klett Unit showing the degree of multiplication in FIGS. 1 and 2 is the turbidity measured by Klett-Summerson Photoelectric Colorimeter (a product of Klett MFG. Co. Inc., U.S.A.) using No. 66-filter.

The results of exemplified experiments wherein the culturing was conducted in the same manner as described above except that potassium chloride was added to bouillon medium instead of sodium chloride are given in FIG. 2. As is clear from FIG. 2, there was observed no growth in the case of medium containing no potassium chloride but there were observed excellent growth in the case of media containing 1 – 3 moles/$l$ of the potassium chloride and sufficient growth in the case of medium containing 4 moles of the potassium chloride per litre of the medium.

The temperature for culturing is 20° – 40°C, preferably around 30°C, the pH for culturing is 6 – 10 and it is usually preferred that the period for culturing is 1 – 10 days.

The cultured broth is subjected to ordinary treatments for removing cells such as, for example, centrifugation, vacuum filtration and the like to obtain the supernatant (crude enzyme solution).

The inactivation of the enzymatic activity of the crude enzyme solution during storage for a long period of time can be prevented by storing at 5°C or less or by lyophilizing it.

The crude enzyme solution can be concentrated by subjecting to well-known treatments such as, for example, vacuum condensation, lyophilization, ultrafiltration and the like.

The concentrated solution is dialyzed against a buffer solution containing 2 – 4 moles of sodium chloride per litre of the solution.

The thus dialyzed solution can be purified by subjecting it to elution device using gel filtrating agents, such as for example, Sephadex (Pharmacia Co., Ltd., Sweden), Biogel (Bio Rad Co., U.S.A) or the like; or to concentration distribution method after being adsorbed in hydroxylapatite (Seikagaku Kogyo Co., Japan), CM-cellulose (Brown Co., U.S.A.), DEAE-Sephadex (Pharmacia Co., Ltd., Sweden) and the like.

The thus purified halophilic nuclease becomes inactive when dialyzed against a buffer solution containing hardly sodium chloride, but the recovery of the enzymatic activity can be attained by redialyzing said dialyzed enzyme against a saline solution containing 2 – 4 moles of sodium chloride per litre.

There are given the physico-chemical properties of the novel halophilic nuclease according to the present process as follows:

1. Enzymatic activity

Releases nucleotides from the native or heat-denatured deoxyribonucleic acid (DNA) or ribonucleic acid (RNA) by cleaving the nucleotide chains at the terminal of DNA or RNA.

In the course of enzymatic reaction, the accumulation of alcohol-soluble materials increases in proportion to the decrease of the viscosity.

2. Substrate specificity

Able to decompose calf thymus DNA and RNA of yeasts, but does not decompose di-p-nitrophenyl phosphate which is easily decomposed by phosphodiesterases.

More active against heat-denatured DNA than native DNA.

The activity against RNA is about three times the activity against DNA.

FIG. 3 shows the relationship between the enzymatic activity when used DNA as a substrate and the concentrations of sodium chloride in the enzymatic reaction solution. As the concentration of sodium chloride was raised, the enzymatic activity increased. The activity thereof in the reaction solution containing 3 moles/l of sodium chloride was about twice that in the reaction solution containing 1 moles/l of sodium chloride. The similar halophilic property was observed when used RNA.

Measurement of enzymatic activity.

After being incubated a reaction solution containing 0.5 ml of 0.2 % DNA aqueous solution (or 1.2 % RNA aqueous solution), 0.4 ml of 0.1 mole/l tris-buffer solution containing sodium chloride at the rate of 4 moles per litre (pH 8.0), 0.1 ml of 0.1 mole/l magnesium sulfate solution and 0.3 ml of the enzyme solution at 40°C for 1 hour, 4 ml of 99.5 % ethanol are added to the reaction solution and the resultant is centrifuged to obtain the supernatant. The one unit of enzymatic activity of the present enzyme in the present specification means the one making the absorbance at 260 $\mu$ 0.1 when measured that of said supernatant. Note: Trisbuffer solution means tris hydroxymethyl aminomethane buffer solution.

3. Optimum pH and stable pH range

The optimum pH is around 8.0 and the stable pH range is 5 – 12.

4. Optimum temperature for enzymatic activity

Falls within 40°C – 45°C.

5. Factors influencing on inactivation

There is hardly observed inactivation due to emperature until 25°C, however, there is observed a pretty inactivation at 40°C and also observed a coomplete inactivation at 50°C. As to pH of the enzyme solution, there is observed slight inactivation at pH 4.0.

6. Inhibition and activation of enzymatic activity

The present enzyme becomes inactive rapidly when dialyzed against water or 0.01 mole/l of trisbuffer solution containing 0.05 mole/l of sodium chloride therein and the present enzyme shows a strong enzymatic activity in a solution whose sodium chloride concentration is 1 – 3 moles/l in contrast to the conventional nucleases whose activities are inhibited to a considerable extent in 0.2 mole/l sodium chloride aqueous solution and are almost inactivated in 1 mole/l sodium chloride aqueous solution.

The present enzyme is activated in the presence of 0.1 mole/l $Mg^{++}$ ion or 0.01 mole/l $Mn^{++}$ ion while inactivated completely in the presence of 0.01 mole/l $Zn^{++}$ ion or $Cu^{++}$ ion.

7. Purification method

To the filtered broth (crude enzyme solution) of the foregoing *Micrococcus varians var. halophilus var. nov.* (ATCC No. 21971, FERM-P No. 1648) is added an organic solvent such as, for example, alcohol, acetone or the like according to the usual way to precipitate the enzyme. The precipitate is dissolved in a buffer solution containing sodium chloride and then the resultant is concentrated in the usual way using a Diaflo membrance, a collodion bag and the like. Thereafter, the contaminants are removed by DEAE ion exchangers or CM ion exchangers to obtain a partially purified enzyme solution. The solution is subjected to gel-filtration using Sephadex or Biogel to obtain the purified enzyme.

8. Molecular weight

The molecular weight of the present enzyme was determined according to Andrews Method ]see Biochemical Journal, 91, 222, (1964)] using Sephadex G-100 (a product of Pharmacia Co., Ltd., Sweden) which had been in advance equilibrated to 0.01 mole/l trishydrochloric acid buffer solution (pH 8.0) containing 2.0 mole/l of sodium chloride and found that it was about one hundred thousand.

9. Electrophoresis

Since it is quite difficult to crystalize the present enzyme, it is impossible to determine the crystal structure thereof and elemental analytical values.

Therefore, the electrophoretic state of the present enzyme was determined according to modified disc electrophoresis method [see R. A. Ricefield, U. J. Lewis D. E. Williams, Nature, 195, 281 (1962)].

That is, after 300 $\mu$g of the enzymatic protein was dialyzed against 0.01 mole/l tris-buffer solution (pH 8.0) containing 0.01 mole/l of $Mg^{++}$, the dialyzed solution was electrophorezed with 2 mA current on a gel of pH 8.3 in the presence of 0.01 mole/l of $Mg^{++}$ for 3.5 hours. The obtained gel was sliced and the sliced gels were extracted with 1 ml of 0.01 mole/l tris-buffer solution containing 2 moles/l sodium chloride therein, respectively. The absorbance of the extracts at 280 $\mu$ was determined by using Hitachi Sepectrophotometer Model 139 (manufactured by Hitachi Ltd.) in addition to the enzymatic activity. The results are shown in FIG. 4.

As is clear from FIG. 4, the absorbance curve of the protein at 280 $\mu$ agreed well with the activity and, thereby, it has been proved that the present enzyme is homogeneous.

The following examples are given to illustrate the present invention but are not to be considered a limitation thereupon.

EXAMPLE 1

*Micrococcus varians var. halophilus var. nov.* (ATCC No. 21971, FERM-P No. 1648) was precultured in a sodium chloride containing medium shown in Table 1 at 30°C for 42 hours. 10 ml of the thus precultured broth were inoculated in 1,000 ml of the medium consisting of the same composition as described above in a 5l Erlenmeyer flask and the shake culture was conducted for 48 hours with the initial pH 7.0

Table 1

| | | |
|---|---|---|
| Casamino acid | 0.75 | g/100 ml |
| Yeast extract | 1.0 | g/100 ml |
| Sodium citrate | 0.3 | g/100 ml |
| Potassium chloride | 0.2 | g/100 ml |
| Magnesium sulfate | 2.0 | g/100 ml |
| Sodium chloride | 12.0 | g/100 ml |
| Ferrous chloride | 0.0023 | g/100 ml |
| pH | 7.0 | |

750 ml of the cultured broth were centrifuged to remove cells and the supernatant was subjected to ultrafiltration with a Diaflo equipped with a molecular sieve of PM-10 (a product of Amicon Co. Ltd., U.S.A.).

25 ml of the thus concentrated enzyme solution were dialyzed against 4 l of 0.01 mole/l trisbuffer solution (pH 8.0) containing 2 moles/l sodium chloride.

30 m*l* of the dialyzed solution were subjected to gel-filtration with Sephadex G-100 using the foregoing tris-buffer solution as an eluting solution to obtain a purified solution of the present enzyme. The yield of the present halophilic nuclease in the purified solution was 6.2 mg.

The yield was determined by O. H. Lowry's method [see Journal of Biological Chemistry, 193, 265 – 275 (1951)] using bovine serum albumin as a standard protein. In the following examples, the yield was determined by the same method.

EXAMPLE 2

*Micrococcus varians var. halophilus var. nov.* (ATCC No. 21971, FERM-P No. 1648) was precultured in a potassium chloride contaning medium shown in Table 2 at 30°C for 72 hours. 10 m*l* of the precultured broth were inoculated in 1,000 m*l* of the same medium as described above in 5 *l* Erlenmeyer flask and the shake culture was conducted at 30°C for 72 hours with the initial pH 7.0

Table 2

| | |
|---|---|
| Peptone | 1.0 g/100 ml |
| Beef extract | 1.0 g/100 ml |
| Potassium chloride | 22.0 g/100 ml |
| pH | 7.0 |

730 m*l* of the cultured broth were centrifuged to remove cells and the resultant supernatant was subjected to ultrafiltration with a Diaflo equipped with a molecular sieve of PM-30 (a product of Amicon Co. Ltd., U.S.A.).

10 m*l* of the thus concentrated solution were dialyzed against 4 *l* of 0.01 mole/*l* tris-buffer solution containing 1 mole/*l* sodium chloride (pH 8.0).

12 m*l* of the dialyzed solution were subjected to a gel-filteration with Sephadex G-100 using the foregoing tris-buffer solution as an eluting solution to obtain a purified solution of the halophilic. The yield of the halophilic nuclease in the purified solution was 5.3 mg.

EXAMPLE 3

*Micrococcus varians var. halophilus var nov.* (ATCC No. 21971, FERM-P No. 1,648) was precultured in a sodium chloride containing medium shown in Table 3 at 30°C for 70 hours. 200 ml of precultured broth were inoculated in 20 l of the same medium as described above except that 0.2 % (W/V) of silicone was added to in a 30 l - jar fermenter and the culturing was conducted with the initial pH 7.0 at 30°C for 42 hours with forced aeration at the rate of 20 *l*/min.

Table 3

| | |
|---|---|
| Casamino acid | 1.0 g/100 ml |
| Yeast extract | 1.0 g/100 ml |
| Sodium chloride | 12.0 g/100 ml |
| pH | 7.0 |

To 18 l of the supernatant obtained by subjecting the cultured broth to a continuous centrifugation was added the same volume of ethyl alcohol as that of the supernatant and the resultant solution was left for one night at 5°C. The solution was subjected again to a continuous centrifugation to obtain the supernatant. To the supernatant was added the same volume of ethyl alcohol as that of the supernatant and the rsultant mixture was left for one night at 5°C.

The upper portion of the thus treated solution was removed by decantation and the precipitate portion was collected by centrifugation. The collected precipitates were dissolved in 1 *l* of 0.01 mole/*l* tris-buffer solution (pH 8.0) containing 0.3 mole/*l* sodium chloride therein and the resultant solution was subjected to ultrafiltration with a Diaflo equipped with a molecular sieve of pM-30.

The enzymatic solution was dialyzed against the said buffer solution and then the dialyzed solution was adsorbed on a column of DEAE-Sephadex A-50 (a product of Pharmacia Co., Ltd,. Sweden) which had been in advance equilibrated to the said buffer solution and the column was washed with the said buffer solution.

Thereafter, a linear concentration gradient elution was conducted between 0.01 mole/*l* tris-buffer solution (pH 8.0) containing 0.3 mole/*l* sodium chloride and 0.01 mole/*l* tris-buffer solution (pH 8.0) containing 0.8 mole/*l* sodium chloride.

The solution obtained by concentrating the active portion of the above-mentioned eluates with a collodion bag was subjected to a gel-filtration with Sephadex G-100 which had been in advance equilibrated to 0.01 mole/*l* tris-buffer solution (pH 8.0) containing 2.0 moles *l* sodium chloride therein and the obtained eluate was again subjected to a gel-filtration with Sephadex G-200 (a product of Pharmacia Co., Ltd., Sweden) in the same manner as described above to obtain a purified solution of the halophilic nuclease.

The purified enzyme solution was purified one thousand five hundred times the crude enzyme solution, and the yield in the purified enzyme solution was 8.5 mg.

EXAMPLE 4

*Micrococcus varians var. halophilus var. nov.* (ATCC No. 21971, FERM-P No. 1648) was precultured in a potassium chloride and sodium chloride-containing medium shown in Table 4 at 30°C for 70 hours. 200 ml of the precultured broth were inoculated in 20 *l* of the same medium as described above except that 0.2 percent (w/v) of silicone was added thereto in a 30 *l* -jar fermenter and the culturing was conducted with the initial pH 7.0 at 30°C for 42 hours with forced aeration at the rate of 20 *l*/min.

Table 4

| | |
|---|---|
| Casamino acid | 1.0 g/100 ml |
| Yeast extract | 1.0 g/100 ml |
| Potassium chloride | 7.5 g/100 ml |
| Sodium chloride | 6.0 g/100 ml |
| pH | 7.0 |

To 18 *l* of the supernatant obtained by centrifuging the cultured broth continuously was added the same volume of ethyl alcohol as that of said supernatant and the resultant mixture was left at 5°C for one night. The mixture was centrifuged continuously and the same volume of ethyl alcohol as that of the resultant supernatant was added to the said supernatant and the resultant mixture was left at 5°C for one night.

The upper portion of the resultant solution was removed by decantation and the precipitate portion was collected by centrifugation. The precipitates were dissolved in 1 *l* of 0.01 mole/*l* tris-buffer solution containing 0.3 mole/*l* sodium chloride and the resultant solution was subjected to ultrafiltration with a Diaflo equipped with a molecular sieve of pM-30.

The thus obtained enzyme solution was dialyzed against the above-mentioned buffer solution, and the dialyzed solution was adsorbed on a column of DEAE-Sephadex A-50 and the column was washed with the said buffer solution.

Thereafter, a linear concentration gradient elution was conducted between 0.01 mole/$l$ tris-buffer solution (pH 8.0) containing 0.3 mole/$l$ sodium chloride and 0.01 mole/$l$ tris-buffer solution (pH 8.0) containing 0.8 mole/$l$ sodium chloride.

The active portion of the thus obtained eluate was concentrated with a collodion bag and the concentrated eluate was subjected to a gel-filtration with Sephadex G-100 which had been in advance equilibrated to 0.01 mole/$l$ tris-buffer solution (pH 8.0) containing 2.0 mole/$l$ sodium chloride and the thus treated active eluate was subjected again to a gel-filtration with Sephadex G-200 in the same manner as described above to obtain a purified solution of the halophilic nuclease.

The purified enzyme was purified one thousand five hundred and seventy times the crude enzyme solution and the yield in the purified enzyme solution was 7.0 mg.

We claim:

1. A process for producing a halophilic nuclease comprising culturing in a medium containing 1 to 4 moles/$l$ of at least one member selected from the group consisting of sodium chloride and potassium chloride a microorganism strain *Micrococcus varians var. halophilus var nov.* (ATCC 21971, FERM-P No. 1648) said strain having a capability of producing halophilic nuclease in the presence of sodium chloride and/or potassium chloride to accumulate the enzyme and collecting the enzyme from the cultured broth.

2. The process according to claim 1, wherein culturing is conducted in a pH of 6- 10, at a temperature of 20° - 40°C for 1 - 10 days under aerobic conditions.

3. The process according to claim 1, wherein culturing is conducted with stirring or shaking for aeration.

4. The process according to claim 1, wherein collecting is conducted by removing cells by means of centrifugation or filtration under reduced pressure to obtain a crude enzyme solution.

5. The process according to claim 4, wherein the crude enzyme solution is concentrated by concentration under reduced pressure, lyophilization or ultrafiltration.

6. The process according to claim 5, wherein the concentrated crude enzyme solution is dialyzed against a sodium chloride-containing buffer solution.

7. The process according to claim 6, wherein the dialyzed crude enzyme solution is purified by means of a gel filter.

8. The process according to claim 7, wherein the gel filter is Sephadex or Bio-gel.

9. The process according to claim 6, wherein the dialyzed crude enzyme solution is purified by separating by means of the concentration distribution method after adsorbing the crude enzyme solution on an adsorbant.

10. The process according to claim 2, wherein the adsorbant is hydroxylapatite, CM-cellulose or DEAE Sephadex.

11. A halophilic nuclease having the following characteristics:
  1. having a capability of releasing nucleotides by cleaving the nucleotide-chain at the terminal of native or heat-denatured deoxyribonucleic acid (DNA) or ribonucleic acid (RNA),
  2. decomposing calf thymus DNA and RNA of yeasts,
  3. being unable to decompose di-p-nitrophenyl phosphate which is decomposed by phosphodiesterase,
  4. showing a stronger activity against heat-denatured DNA as compared with DNA,
  5. being three times active against RNA than DNA,
  6. the optimum pH thereof is around 8.0 and the stable pH range is 5 – 12 and being inactivated slightly at pH 4.0,
  7. the optimum temperature for enzymatic reaction is at a temperature of 40° – 45°C while it is inactivated to a considerable extent at 40°C and it is inactivated completely at 50°C,
  8. being inactivated quickly when dialyzed against water, 0.05 mole/$l$ of sodium chloride-containing 0.01 mole/$l$ tris-buffer solution (pH 8.0),
  9. showing a strong enzymatic activity in a 1 – 3 mole/$l$ of sodium chloride-containing aqueous solution,
  10. being activated by 0.1 mole/$l$ of $Mg^{++}$ ion or 0.01 mole/$l$ of $Mn^{++}$ ion-containing aqueous solution,
  11. being inactivated completely 0.01 mole/$l$ of $Zn^{++}$ ion or 0.01 mole/$l$ of $Cu^{++}$ ion-containing aqueous solution,
  12. whose molecular weight is about one hundred thousand and
  13. being single electrophoretically.

* * * * *